United States Patent [19]
Nagai et al.

[11] Patent Number: 5,991,170
[45] Date of Patent: Nov. 23, 1999

[54] EQUIPMENT AND METHOD FOR TRANSMITTING ELECTRIC POWER

[75] Inventors: Tamiji Nagai; Toshitaka Takei, both of Kanagawa; Kuniharu Suzuki, Tokyo, all of Japan

[73] Assignee: Sony Corporation, Tokyo, Japan

[21] Appl. No.: 09/155,600

[22] PCT Filed: Feb. 3, 1998

[86] PCT No.: PCT/JP98/00441

§ 371 Date: Oct. 1, 1998

§ 102(e) Date: Oct. 1, 1998

[87] PCT Pub. No.: WO98/34319

PCT Pub. Date: Aug. 6, 1998

[51] Int. Cl.[6] .................................................. H02M 3/335
[52] U.S. Cl. ............................................. 363/20; 363/131
[58] Field of Search .................................. 363/16, 20, 21, 363/95, 97, 98, 131, 132

[56] References Cited

U.S. PATENT DOCUMENTS

| | | | |
|---|---|---|---|
| 4,727,463 | 2/1988 | Suzuki | 363/21 |
| 4,933,830 | 6/1990 | Sato et al. | 363/131 |
| 5,173,847 | 12/1992 | Suzuki | 363/21 |
| 5,268,547 | 12/1993 | Bessyo et al. | 219/10.55 B |
| 5,406,469 | 4/1995 | Schwarz et al. | 363/21 |
| 5,488,552 | 1/1996 | Sakamoto et al. | 363/21 |
| 5,581,451 | 12/1996 | Ochial | 363/21 |
| 5,598,324 | 1/1997 | Imamura et al. | 363/21 |
| 5,808,879 | 9/1998 | Liu et al. | 363/17 |
| 5,856,917 | 1/1999 | Aonuma et al. | 363/21 |
| 5,883,794 | 3/1999 | Takahashi et al. | 363/21 |

FOREIGN PATENT DOCUMENTS

| | | |
|---|---|---|
| 200321 | 11/1986 | European Pat. Off. . |
| 473957 | 11/1992 | European Pat. Off. . |
| 141034 | 5/1985 | Japan . |
| 5358 | 4/1987 | Japan . |
| 285436 | 10/1992 | Japan . |

Primary Examiner—Adolf Deneke Berhane
Attorney, Agent, or Firm—Jay H. Maioli

[57] ABSTRACT

In an electric power transmission device which transmits electric power between a primary coil and a secondary coil, a resonant frequency of the secondary coil side is arranged to become higher than a frequency of an oscillation signal of the primary coil side, so that a capacitance can be made small and the coupling coefficient of the primary coil and the secondary coil can be made high. Thus, efficiency of power transmission from the primary coil side to the secondary coil side can be improved.

14 Claims, 8 Drawing Sheets

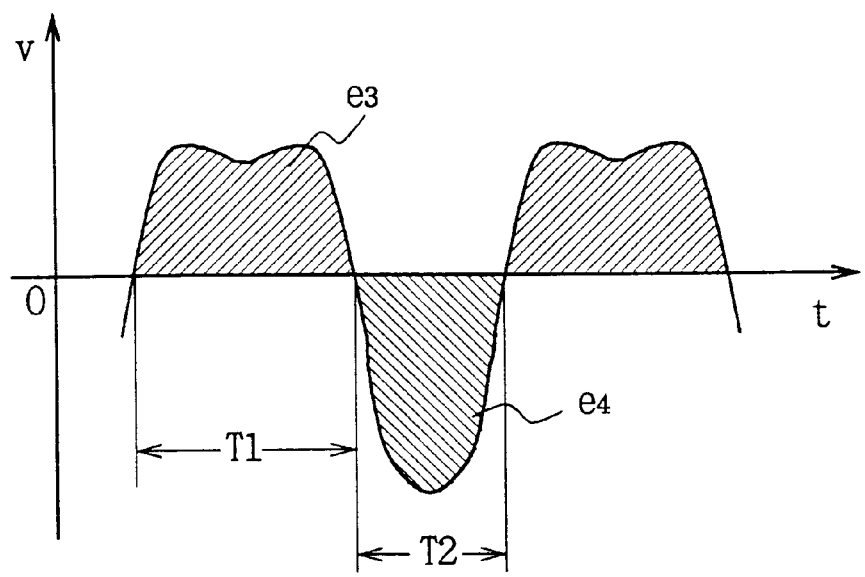
F I G. 5
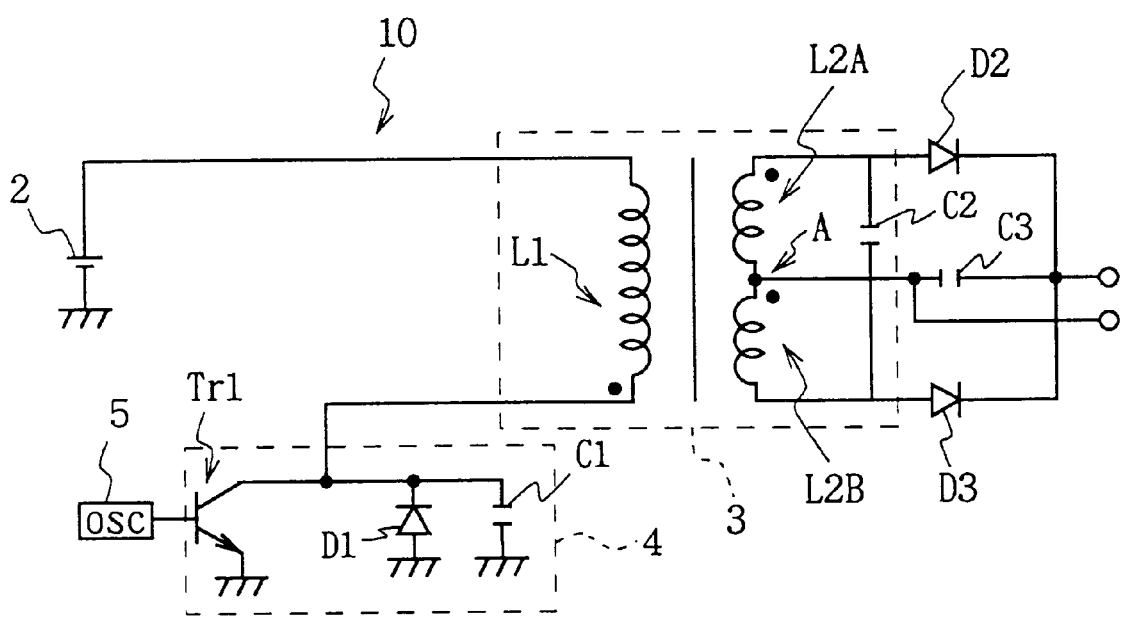
F I G. 6

EQUIPMENT AND METHOD FOR TRANSMITTING ELECTRIC POWER

TECHNICAL FIELD

The present invention relates to an electric power transmission device and an electric power transmission method, where an electric power transmission device and an electric power transmission method are used to charge electric power to a secondary battery built in a portable compact electronic equipment via a noncontact terminal.

BACKGROUND ART

In recent years, there has been a sharp rise in demand for portable compact electronic equipment, such as a small-sized headphone stereo, combination camera/video tape recorder and mobile communication terminal. These portable compact electronic equipment are equipped with rechargeable and high capacity secondary batteries as their power source and are charged by using a prescribed charger.

One type of the charger device is a contact type. This contact type charger has a spring-loaded point of contact. By contacting a point of contact of the portable compact electronic equipment side to the point of contact to electrically connect them, and then the charging current is supplied to the secondary battery built in the portable compact electronic equipment to form the electric path.

However, in these chargers, the point of contact may be oxidized or contaminants may be build up on the point of contact with time. These oxidation and contaminants cause the disconnection on the part of these contact points and hinder the supply of charging current to the secondary battery.

To avoid such problems, a charger using the noncontact type charging system has been considered. As the noncontact type charging system, a system of supplying the charging current from the charger to the secondary battery by the electromagnetic induction can be considered.

More specifically, a primary coil is provided on a terminal of the charger side and a secondary coil is provided on a terminal of the portable compact electronic equipment, and the primary coil and the secondary coil are brought close. When an electric current is fed to the primary coil under this condition, the primary coil generates the magnetic flux. At this point, if the current to be fed to the primary coil is turned ON or OFF at established intervals, the magnetic flux to be generated by the current induction varies with time. In the secondary coil side, an inducted electromotive force is generated by the electromagnetic induction due to the linkage of the magnetic flux which varies with time. The primary coil generates alternating current of which the direction of current is reversed according to the ON/OFF of the primary coil side as inducted current with the inducted electromotive force as a power supply. Thus, the noncontact type charger conducts charging by supplying the inducted current to be generated in the secondary coil to the secondary battery as the charging current.

With this arrangement, by bringing the primary coil of the charger side and the secondary coil of the portable compact electronic equipment side close, the electric power will be transmitted from the primary coil side to the secondary coil side using the magnetic contact by the electromagnetic induction, and thereby the noncontact type charger can be obtained.

In the charger constructed as described above, the primary coil and the secondary coil are built in the charger side and the electronic equipment side respectively, and by transmitting the power by the electromagnetic induction from the primary coil to the secondary coil, the noncontact power transmission can be conducted.

However, in this case, as the distance between the primary coil and the secondary coil is lengthened (in the case of magnetic permeability of the air), a coupling coefficient between the primary coil and the secondary coil becomes worse and the amount of linkage of the magnetic flux generated in the primary coil to the secondary coil decreases. Therefor, in the electric power transmission device, it is difficult to increase the degree of coupling between the primary coil and the secondary coil such as the general transformer.

Accordingly, the electric power transmission device described above has a problem that the efficiency in the power transmission becomes low due to the power loss by weak coupling.

DISCLOSURE OF THE INVENTION

The present invention has been done considering the above point and is proposing an electric power transmission device and an electric power transmission method which are capable of improving the efficiency in electric power transmission from the primary coil side to the secondary coil side.

To solve such problems, in the present invention, the electric power transmission device for transmitting the electric power between the primary coil and the secondary coil, comprises signal generating means for generating and transmitting an oscillation signal formed of a fixed frequency, current supplying means for supplying the electric current to be conducted to the primary coil, driving means for drive-controlling the conduction and interception of the electric current to the primary coil based on the frequency of the oscillation signal, a primary coil for generating a magnetic flux which varies with time, based on the frequency of oscillation signal by drive controlling the conduction and interception of the electric current, and a secondary coil to which a capacitance element is connected in parallel, for generating an induced electromotive force according to the linkage of the magnetic flux which varies with time and is generated in the primary coil, and for performing resonant of the induced electric current to be generated between the capacitance element and the secondary coil based on the induced electromagnetic force with the frequency higher than the frequency of oscillation signal as the oscillation frequency, so that the inducted electromotive force can be transmitted to the secondary coil by the linkage of the magnetic flux which varies with time and is generated in the primary coil.

Since the frequency higher than the frequency of oscillation signal of the primary coil side is chosen as the resonant frequency of the secondary coil side, the capacitance can be reduced and the coupling coefficient between the primary coil and the secondary coil can be apparently increased. Thus, the efficiency in the power transmission from the primary coil side to the secondary coil side can be improved.

BRIEF DESCRIPTION OF THE DRAWINGS

FIG. 5 is a diagram explaining the induction voltage to be generated in the secondary coil.

FIG. 6 is a circuit diagram showing the construction of a charger and an electronic equipment according to the second embodiment of the present invention.

BEST MODE FOR CARRYING OUT THE INVENTION

An embodiment of the present invention will be described in detail with reference to the accompanying drawings.

(1) The First Embodiment

Figure 1:
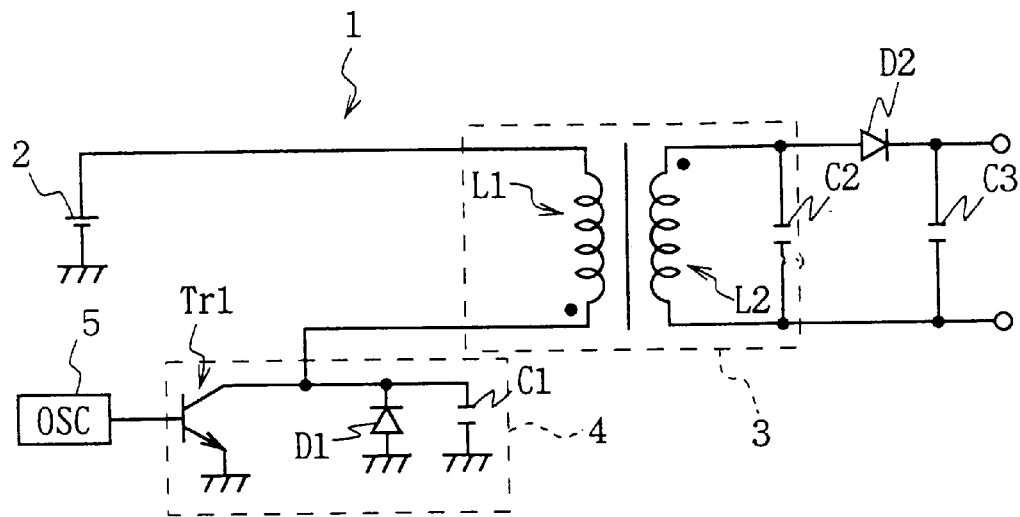
FIG. 1 is a circuit diagram showing the construction of a charger and an electronic equipment according to the first embodiment of the present invention.

In FIG. 1, numeral 1 generally shows a charger, in which a secondary battery is recharged by supplying the electric power sent out from a power source 2 to the secondary battery which is built in the prescribed electronic equipment via an electromagnetic induction section 3. The electromagnetic induction section 3 is comprised of a primary coil L1 placed in the charger 1 side and a secondary coil L2 provided in the electronic equipment, and these primary coil L1 and the secondary coil L2 do not have a point of contact with each other. One terminal of the primary coil L1 is connected to the power source 2, and both terminals of the secondary coil L2 are connected to the secondary battery. The charger 1 is comprised of the primary coil L1 and the secondary coil L2 which are winded around cores having the fixed shapes respectively and these cores are placed facing each other when charging.

In the charger 1, the other terminal of the primary coil L1 is connected to a driving circuit 4 and the driving circuit 4 is connected to a driving frequency generating unit 5. The driving frequency generating unit 5 generates an oscillation signal formed of the prescribed frequency $f_{OSC}$ and supplies this to the driving circuit 4. The driving circuit 4 feeds the supplied oscillation signal to a base electrode of a transistor Tr1 which is emitter grounded. When the voltage level of the oscillation signal entered into the base electrode is positive value, the transistor Tr1 conducts the current between the emitter electrode and the collector electrode. Thus, the current to be sent out from the power source 2 flows into the primary coil L1.

Furthermore, in the case where the voltage level of the oscillation signal to be entered into the base electrode of the transistor Tr1 becomes the negative value, the transistor Tr1 cuts off the conduction between the emitter electrode and the collector electrode. Under this condition, the current to be transmitted from the power source 2 does not flow into the primary coil L1, and an LC circuit formed by the primary coil L1 and a capacitor C1 of the driving circuit 4 forms a resonance circuit and an inverse electromotive force is generated in the primary coil L1. The current flows into the capacitor C1 to conduct the charging with the voltage by this inverse electromotive force as an electric source, and the current of the opposite direction flows into the primary coil L1 when the capacitor C1 conducts discharging to the primary coil L1. The current increases as the voltage of the capacitor C1 drops, and when the voltage of the capacitor C1 becomes 0, the current becomes the maximum. Then, the capacitor C1 is charged by the voltage of the opposite direction. At the point of time when the voltage exceeds the voltage of the power source 2, a damper diode D1 in the driving circuit 4 is conducted and the LC circuit becomes short-circuited condition and oscillation by the LC circuit stops and the current flowing into the primary coil L1 decreases linearly. At the time when the current becomes 0, the transistor Tr1 state becomes ON, and these operations are repeated thereafter. In this way, the current flowing into the primary coil L1 vibrates moving forward and backward alternately by the driving circuit 4, and accordingly, the voltage to be produced in the primary coil L1 becomes the form of horizontal pulse that changes based on the driving frequency $f_{OSC}$ to be transmitted from the driving frequency generating unit 5.

The magnetic flux is generated in the primary coil L1 as the current flows and the magnetic flux varies over time corresponding to the oscillation of the current described above. Moreover, the induced electromotive force is generated in the secondary coil L2 by the linkage of the magnetic flux which varies with time, to the secondary coil L2. Thus, the current flows through the secondary coil L2 by the induced electromotive force which reverses according to the time-varying magnetic flux, and the resonant occurs in the current by the secondary coil L2 and a capacitor C2 connected to the secondary coil L2 in parallel. Thus, the alternating induced current generated in the secondary coil L2 is sent out via the diode D2. The electronic equipment having the secondary coil L2 rectifies the induced current to be generated having the induced electromotive force as the power source, with the diode D2 and supplies this to the secondary battery to charge. The charger 1 transmits the electric power to be sent out from the power source 2 by the electromagnetic induction, from the primary coil L1 to the secondary coil L2 to charge.

Figure 2:
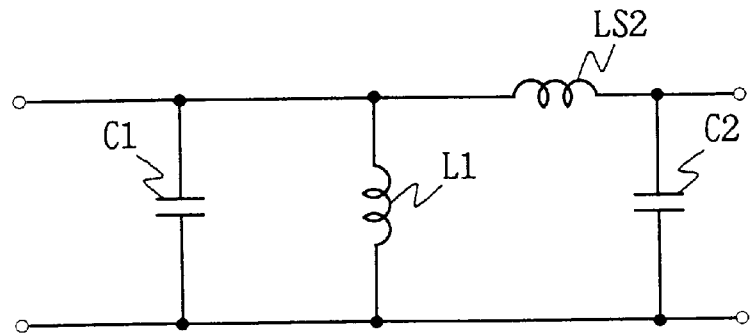
FIG. 2 is a circuit diagram showing an equivalent circuit of an electromagnetic induction section.

In this connection, FIG. 2 shows an equivalent circuit of the electromagnetic induction section 3 and LS2 shown in this figure is leakage inductance of the secondary coil L2 side.

Figure 3:
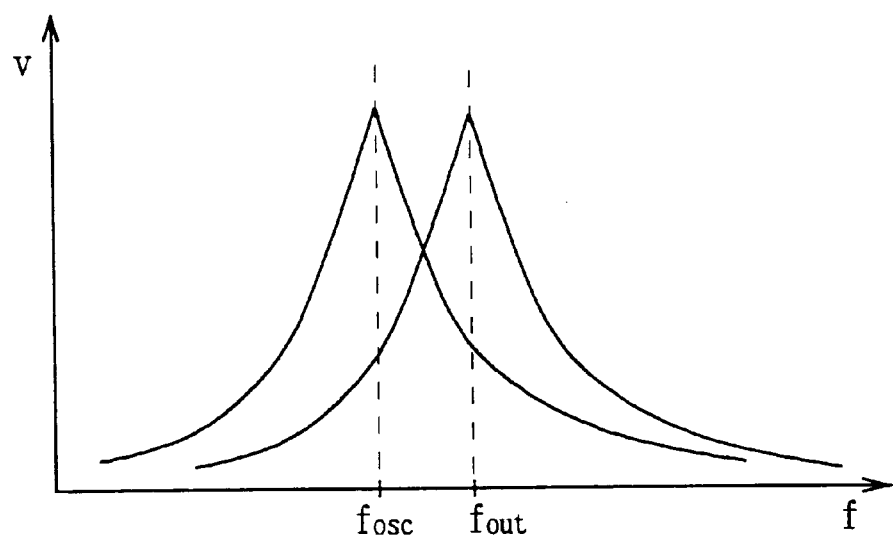
FIG. 3 is a diagram explaining the relation between the driving frequency of the primary coil and the resonant frequency of the secondary coil.

At this point, as shown in FIG. 3, in the charger 1, assuming that the frequency of induction voltage to be generated in the secondary coil L2 by the induced electromotive force to be reversed, that is the resonant frequency, is $f_{OUT}$, the resonant frequency $f_{OUT}$ is set to become higher than the frequency to drive-control the current flowing through the primary coil 1, that is the driving frequency $f_{OSC}$. The resonant frequency $f_{OUT}$ with respect to the driving frequency $f_{OSC}$ can be set by adjusting the number of winds of the secondary coil L2 with respect to the number of winds of the primary coil or by adjusting the capacity of the resonant capacitor C2 connected to the secondary coil L2 in parallel.

Figure 4:
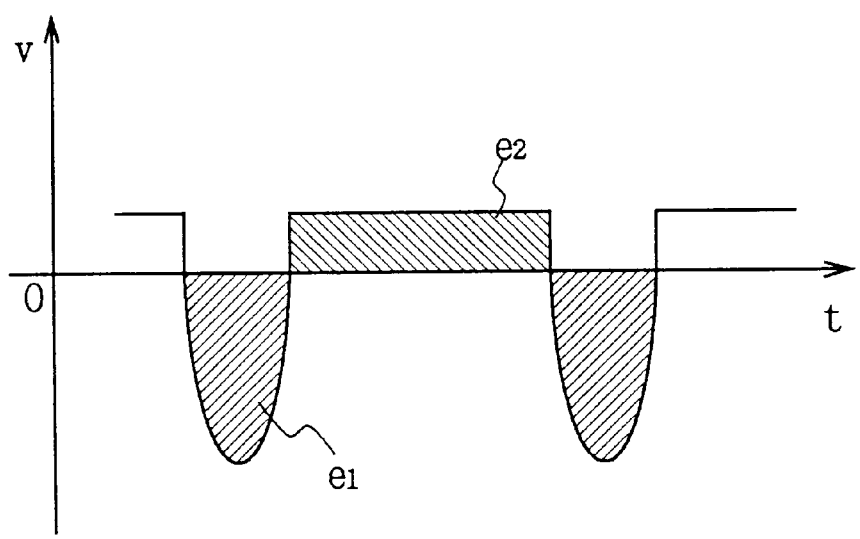
FIG. 4 is a diagram explaining the driving voltage to be given to the primary coil according to the driving frequency.

As shown in FIG. 4, the current flows through the primary coil L1 in the forward direction or in the backward direction in accordance with the ON/OFF condition of the transistor Tr1 of the driving circuit 4, and the voltage generated in the primary coil L1 appears in the form of pulse wave formed of the driving frequency $f_{OSC}$. Here, $e_1$ is a power element to be formed in the primary coil L1 when the transistor Tr1 is in the OFF condition, and $e_2$ is a power element to be generated in the primary coil L1 when the transistor Tr1 is in the ON condition.

Furthermore, as shown in FIG. 5, induction voltage formed of the resonant frequency $f_{OUT}$ is generated according to the temporal changes of magnetic flux generated in the primary coil L1. Here, $e_3$ and $e_4$ show power elements based on the voltage and current, which is produced in the secondary coil L2. The power element $e_3$ corresponds to the power element $e_1$ and is produced in the secondary coil L2 when Tr1 is in the OFF condition. Moreover, the power element $e_4$ corresponds to the power element $e_2$ and is produced in the secondary coil L2 when Tr1 is in the OFF condition. At this point, in the electronic equipment comprising the secondary coil L2, the power is taken by rectifying the induced current produced at the power element $e_3$ part, and supplied to the secondary battery. In this connection, since the winding direction of the primary coil L1 and the winding direction of the secondary coil L2 are opposite, the plus and minus of wave forms of the driving frequency to be formed in the primary coil L1 and the resonant frequency to be formed in the secondary coil L2 are reversed.

According to the foregoing construction, the transistor Tr1 of the driving circuit 4 becomes ON/OFF condition according to the frequency of the oscillation signal to be formed in the driving frequency generating unit 5, and when it is in the ON condition, the current to be supplied from the power source 2 flows through the primary coil L1. Moreover, when the transistor Tr1 is in the OFF condition, an inverse electromotive force is generated in the primary coil L1 and the capacitor C1 is charged. Thereafter, the capacitor C1 is discharged, thereby the current flows in the direction opposite to the time when the transistor Tr1 is in the ON condition. Thus, the magnetic flux produced in the primary coil L1 varies with time in accordance with the inversion of the current direction.

An induced electromotive force is generated in the secondary coil L2 by the linkage of magnetic flux produced in the primary coil L1 and the direction of the induced electromotive force changes according to the temporal changes of magnetic flux. Thus, in the secondary coil L2, an induction voltage is generated by the resonant frequency $f_{OUT}$ with respect to the driving frequency $f_{OSC}$ by the inversion of the induced electromotive force.

At this point, in the case where the resonant frequency $f_{OUT}$ by the LC circuit of the secondary coil L2 side is set to become the same frequency as the driving frequency $f_{OSC}$ of the primary coil L1, the current level becomes maximum when the voltage level is the largest since the current to be conducted into the primary coil L1 is in phase with the voltage due to the resonance. When the secondary coil L2 side is resonated with such frequency, the power loss by the internal impedance on the LC circuit of the secondary coil L2 side becomes large and the efficiency in the power transmission cannot be improved.

Furthermore, in the case where the resonant frequency $f_{OUT}$ is set to become lower than the driving frequency $f_{OSC}$ of the primary coil L1, the current value of the induced current to be produced in the secondary coil L2 side becomes small because it is resonated with the frequency departed from the frequency of the driving frequency $f_{OSC}$. However, since the time required for discharging the resonant capacitor C2 connected to the secondary coil L2 in parallel becomes longer, the capacitance C equivalently becomes large and the actual efficiency Q decreases, so that the high output voltage cannot be obtained.

The induced current to be generated in the secondary coil L2 is formed of the alternating current as described above, and by decreasing the induced current while increasing the induction voltage, the power can be taken efficiently decreasing the power loss due to the internal impedance. Therefor, the induction voltage to be obtained in the secondary coil L2 side is required as high as possible.

Accordingly, as described above, in the charger 1, since the resonant frequency $f_{OUT}$ of the secondary coil L2 side is set to become higher than the driving frequency $f_{OSC}$ of the primary coil L1 side, the resonant current can be made into low current and the capacitance C in the resonant circuit of the secondary coil L2 can be equivalently made smaller and the actual efficiency Q can be increased. Thus, in the charger 1, by increasing the apparent coupling coefficient, the efficiency in the power transmission from the primary coil L1 to the secondary coil L2 can be improved.

Furthermore, in the electronic equipment having the secondary coil L2, the part of power element $e_3$ at the time when the transistor Tr1 is in the OFF condition is rectified, thereby the power is taken from the induced current to be generated in the secondary coil L2 responding to the direction inversion of the current flowing through the primary coil L1. More specifically, regarding the power elements $e_3$ and $e_4$ (FIG. 5), areas of these elements are the same, and thus, the following relationship exists in these power elements; the width of the current T2 of the power element $e_4$ is narrower than the width of the current T1 of the power element $e_3$, while the voltage value of the power element $e_4$ is larger than the voltage value of the power element $e_3$. Accordingly, in the case where the electric power element $e_4$ part is rectified and taken as the power, high output voltage can be obtained. However, since the width of current T2 is narrower than the width of current T1 of the power element $e_3$, the conduction angle of rectification is narrow and becomes an unstable output source as compared with the case where the power element $e_3$ is rectified.

In the charger 1, since the electronic equipment having the secondary coil L2 rectifies the induced current of the power element $e_3$ part and takes out the power, the conduction angle of rectification can be made wider and a stable source power can be obtained.

According to the foregoing construction, in the case of transmitting the electric power from the primary coil L1 to the secondary coil L2 by the electromagnetic induction between the primary coil L1 and the secondary coil L2, since the resonant frequency $f_{OUT}$ to be produced in the secondary coil L2 side is set to become higher than the driving frequency $f_{OSC}$ of the primary coil L1 and the resonant voltage of the power element $e_3$ part at the time when the transistor Tr1 state is OFF condition is rectified to take out the source power from the resonant voltage produced in the secondary coil L2, the actual efficiency Q can be increased and the apparent coupling coefficient can be increased and at the same time, the power of the power source can be obtained from the resonant voltage having the wide conduction angle of rectification. Thus, the efficiency in power transmission can be increased and the stable current power can be obtained.

(2) The Second Embodiment

In FIG. 6 in which the same reference numerals are applied to parts corresponding to FIG. 1, numeral 10 shows a charger having a source 2, an electromagnetic induction section 3, a driving circuit 4 and a driving frequency generating unit 5, similar to that of the battery device 1. The charger 10 has the primary coil L1 which is winded around a core having the fixed shape as the electromagnetic induction section 3 (FIG. 1), and when charging, the secondary coil L2 winded around a core arranged in the electronic equipment is placed at a position facing the core winded by the primary coil L1.

The charger 10 drive-controls the conduction and interception to the primary coil L1 by turning the transistor Tr1 of the driving circuit 4 into the ON/OFF condition by the oscillation signal to be formed in the driving frequency generating unit 5 in order to flow the current through the primary coil L1 in the forward direction and the backward direction alternately. Thus, the time-varying magnetic flux is generated in the primary coil L1 by the current flowing in the forward direction and the backward direction, and an induced electromotive force is produced in the secondary coil L2 by the linkage of the magnetic flux, so that the resonant current flows by the LC resonance circuit formed of the secondary battery L2 and the capacitor C2 connected to the secondary coil L2 in parallel. The charger 10 is arranged in order that the resonant frequency of the secondary coil L2 becomes higher than the driving frequency of the primary coil L1 as in the case of the charger 1 (FIG. 3).

In addition, in the charger 10, the secondary coil L2 is formed by connecting two coils which are winded around in the same direction, while in the charger 1 in which the secondary coil L2 is formed with a single coil. More specifically, the charger 10 forms an electromagnetic induction section 3 by connecting coils L2A and L2B in series as the secondary coil L2, and after rectifying the voltage of the resonance circuit to be obtained by the inducted electromotive force generated according to the linkage of the magnetic flux, which is formed in the primary coil L1, toward the secondary coil L2, with diodes D2 and D3 respectively, supplies this into the secondary battery as a power source output.

Figure 7:
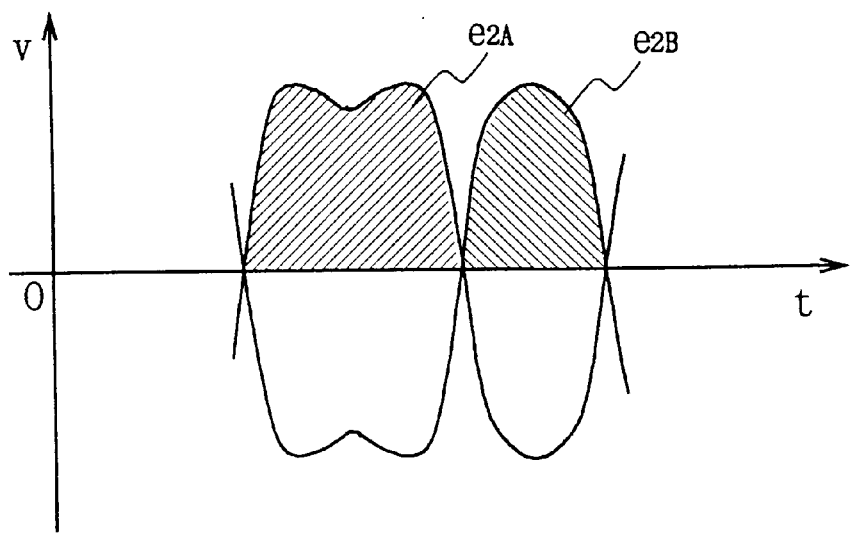
FIG. 7 is a diagram explaining the induction voltage to be generated in the secondary coil.

Since the secondary coils L2A and L2B are winded around the cores in the same direction, as shown in FIG. 7, in the polarity of resonant frequency of the secondary coil L2 with respect to the driving frequency of the primary coil L1, their phases shift each other by 180 degrees observing from a standard point A on which the secondary coils L2A and L2B are connected. In the electronic equipment having the secondary coils L2A and L2B, the resonant voltage generated based on the resonant frequency is rectified and taken out by the diodes D2 and D3 as the power, and the taken power is supplied to the secondary battery to charge.

At this point, in the case where the winding numbers of wires winded around cores of the secondary coil L2A and L2B are the same, the voltage of the power element $e_{2A}$ to be formed in the secondary coil L2A when the transistor Tr1 is in the OFF condition is smaller than the voltage of the power element $e_{2B}$ to be formed in the secondary coil L2B when the transistor Tr1 is in the ON condition. In the case where the power is taken out after rectifying the resonant voltage of the power elements $e_{2A}$ and $e_{2B}$, the difference between these voltages becomes the variable value and unstable electric power. Accordingly, by adjusting the winding numbers of the secondary coil L2A and L2B, about equal values of voltage can be obtained in the secondary coil L2 side. More specifically, the winding number of the secondary coil L2A is arranged to become larger than the winding number of the secondary coil L2B, and thus, the voltage values of resonant voltages to be obtained in the secondary coil L2A and L2B become approximately the same.

According to the foregoing construction, as to the resonant frequency to be generated in the secondary coil L2 side in accordance with the driving frequency of the primary coil L1 side, the resonant frequency of the secondary coil L2A and the resonant frequency of the secondary coil L2B have phases shift each other by 180 degrees, and the induced currents produced based on such resonant frequencies are rectified respectively by the diodes D2 and D3 and sent out. At this point, the ratio of the winding number of coil between the secondary coil L2A and L2B is adjusted so that the winding number of coil of the secondary coil L2A is larger than the winding number of coil of the secondary coil L2B and the induction voltage to be generated in the secondary coil L2A and the induction voltage to be generated in the secondary coil L2B become approximately the same values.

Accordingly, upon rectifying the induced current of the secondary coil L2A and the induced current of the secondary coil L2B of which resonant frequencies have phases shifting each other by 180 degrees and outputting them, the induced current of the power element $e_{2A}$ formed in the secondary coil L2A and the induced current of the power element $e_{2B}$ formed in the secondary coil L2B according to the time-varying of magnetic flux of the primary coil L1 can be taken out as the electric power, and the electric power can be taken out in either case where the transistor Tr1 is in the ON or OFF condition.

Furthermore, by adjusting the ratio of winding number of the secondary coils L2A and L2B, voltage values of the power elements $e_{2A}$ and $e_{2B}$ are to become approximately the same, and accordingly, the stable electric power of which the voltage variation is controlled can be obtained.

According to the foregoing construction, since the resonant frequency to be formed in the secondary coil L2 side is arranged so as to become higher than the driving frequency of the primary coil L1, and the secondary coils L2A and L2B having about equal values of induction voltages which can be obtained by adjusting the winding number of the secondary coil L2A becomes larger than the winding number of the secondary coil L2B are connected and placed in the electronic equipment and the resonant voltages to be formed respectively are rectified and sent out. Thereby, the apparent coupling coefficient can be increased by increasing the efficiency factor Q and at the same time, the resonant voltages of the power elements $e_{2A}$ and $e_{2B}$ to be produced in the secondary coils L2A and L2B can be taken out as the source power. Thus, the efficiency in power transmission from the primary coil L1 to the secondary coil L2 can be improved and the stable power can be obtained regardless of the current direction of the primary coil L1.

(3) The Third Embodiment

Figure 8:
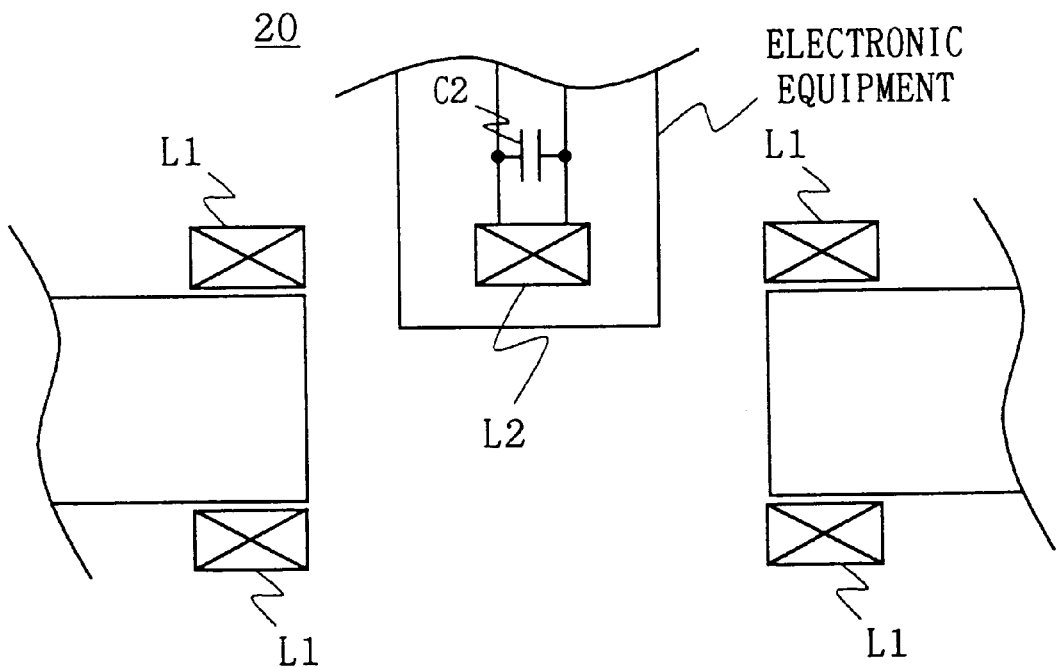
FIG. 8 is a schematic diagram showing the construction of a charger and an electronic equipment according to the third embodiment of the present invention.

In FIG. 8, in which the same reference numerals are applied to parts corresponding to FIG. 1, numeral 20 shows a charger comprised of a power source 2, an electromagnetic induction section 3, a driving circuit 4 and a driving frequency generating unit 5 which have the same construction as the charger 1. The charging unit 20 has the primary coil L1 winded around a core of the fixed shape as the electromagnetic induction section 3 (FIG. 1), and when charging, the core winded by the secondary coil L2 provided in the electronic equipment is placed on the position facing the core winded by the primary coil L1.

The charger 20 drive-controls the conduction and interception to the primary coil L1 by turning the transistor Tr1 of the driving circuit 4 ON or OFF by the oscillation signal generated in the driving frequency generating unit 5 in order to supply the current to the primary coil L1 in the forward direction and the backward direction alternately. Thus, the time-varying magnetic flux is generated in the primary coil L1 by the current flowing in the forward direction and the backward direction, and an induced electromotive force is formed in the secondary coil L2 by the linkage of the magnetic flux, and resonant current flows by the LC circuit of the secondary coil L2 and the capacitor C2 connected in parallel to the secondary coil L2. In this connection, the charger 20 is so arranged that the resonant frequency of the secondary coil L2 becomes higher than the driving frequency of the primary coil L1 as in the case of charger 1.

As compared with the construction of the charger 1, the charger 20 is different from the charger 1 on the loading condition of the primary coil L1 and the secondary coil L2 and sizes of cores winded by the coils. The cross sectional area of the core winded by the secondary coil L2 is smaller than the cross sectional area of the core winded by the primary coil L1, and when charging, the core winded by the primary coil L1 and the core winded by the secondary coil L2 are placed, in which their centers shift each other.

More specifically, in the charger 20, the core of the primary coil L1 side has the fixed ring shape and a part of the core is cut off at the fixed position on the ring and separated by the fixed distance. Moreover, when charging, the core winded by the secondary coil L2 is inserted between the opposite cross sections spaced and is placed facing each cross section. Furthermore, when charging, the charger 20 places the secondary coil L2 in order that the center of the core winded by the secondary coil L2 is shifted from the center of the core winded by the primary coil L1 in the desired direction.

For example, as shown in FIG. 8, in the charger 20, by locating the position of the outer region of the core winded by the secondary coil L2 onto the position of one of the outer regions of the core winded by the primary coil L1, the core of the secondary coil L2 side is placed on the position shifted from the center of the core of the primary coil side. In the charger 20, the resonant frequency of the secondary coil L2 is set to become higher than the driving frequency of the primary coil L1 according to such arrangements.

According to the foregoing construction, the core winded by the secondary coil L2 is inserted between the cross sections separated of the core winded by the primary coil L1 and its center of the core is placed on the position shifted from the center of the core of the primary coil L1 side. Moreover, in the secondary coil 2 side, the resonant frequency is set to become higher than the driving frequency of the primary coil L1 side on the position.

The magnetic flux is generated between the cross sections of each core of the primary coil L1 side, which are separated by the fixed distance, by the current flowing through the primary coil L1, and the driving circuit 4 reverses the direction of current flowing through the primary coil L1 based on the frequency of the oscillation signal to be transmitted from the driving frequency generating unit 5 in order to change the magnetic flux to be produced in the primary coil L1 over time. Thus, the induced electromotive force which reverses in accordance with the time-varying magnetic flux is generated in the secondary coil L2, and the induced current can be obtained with the induced electromotive force as an electric source.

However, in this case, magnetic energy of the magnetic flux causes linkage between the other parts stored in the electronic equipment having the secondary coil L2 and affects these parts and there are cases where heat is generated or operation errors occur.

In the battery device 20, since the core winded by the secondary coil L2 is placed on the position at least separate from the center of the core of the primary coil L1, the effect of magnetic flux to the other electronic parts in the electronic equipment equipped with the secondary coil L2 is and thereby the generation of heat caused by the magnetic field and operation errors can be prevented.

Furthermore, since the cross sectional area of the core of the secondary coil L2 side is made smaller than the cross sectional area of the core of the primary coil L1 side, if the cores are placed on positions shifted from each other, scattering of the magnetic field to be formed between the primary coil L1 and the secondary coil L2 can be decreased. Furthermore, since the cross sectional area of the core is made smaller, a storage capacity of the secondary coil core in the electronic equipment having the secondary coil L2 can be made smaller, thus, the electronic equipment can be minimized.

Also in this case, since the resonant frequency is set to become higher than the driving frequency under such arrangements, the efficiency in power transmission from the primary coil L1 side to the secondary coil L2 side can be improved.

According to the foregoing construction, since charging is conducted under the condition in which the resonant frequency of the secondary coil L2 side is higher than the driving frequency of the primary coil L1 side, and as well as making the cross sectional area of the secondary coil L2 side smaller than the cross sectional area of the core of the primary coil L1 side, the core winded by the secondary coil L1 is placed on the position shifted from the center of the core winded by the primary coil L1, the efficiency factor Q can be made higher and apparent coupling coefficient can be made higher, the effect of the magnetic flux produced in the primary coil L1 with respect to the electronic equipment in the electronic equipment can be decreased. Thereby, as well as the efficiency in electric power transmission from the primary coil L1 to the secondary coil L2 can be improved, the generation of heat or the operation error due to influence of the magnetic field can be prevented and furthermore, miniaturization of the electric equipment can be realized.

(4) The Fourth Embodiment

Figure 9:
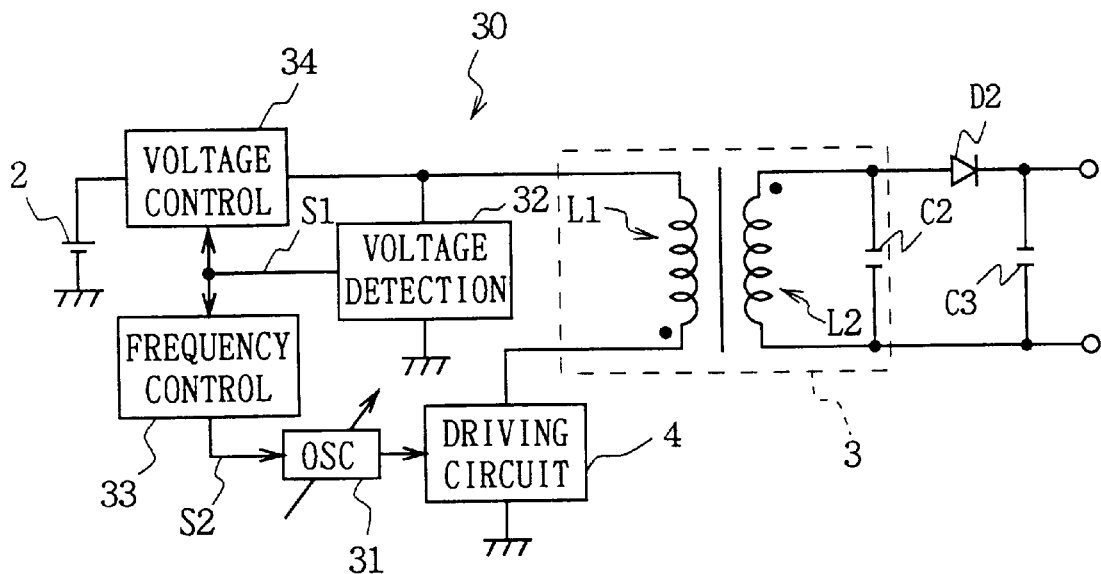
FIG. 9 is a block diagram showing the construction of a charger and an electronic equipment according to the fourth embodiment of the present invention.

In FIG. 9 in which the same reference numerals are applied to parts corresponding to FIG. 1, numeral 30 shows a charger comprised of a source 2, an electromagnetic induction section 3 and a driving circuit 4 as the similar construction to the charger 1. The charger 30 is comprised of the primary coil L1 which winds around the core having the fixed shape as an electromagnetic induction section 3, and when charging, the core winded by the secondary coil L2 placed in the electronic equipment is placed at the position facing the core winded by the primary coil L1.

The charger 30 turns the transistor Tr1 of the driving circuit 4 ON/OFF by an oscillation signal generated in the driving frequency generating unit 5 to drive-control the conduction and interception to the primary coil L1 and flows the current to the primary coil L1 in the forward direction and the backward direction alternately. Thus, by the current flowing in the forward direction and the backward direction, a time-varying magnetic flux is generated in the primary coil L1 and an induced electromotive force is produced by the linkage of the magnetic flux and resonant current flows and resonance occurs by the LC circuit. The charger 30 is arranged so that the resonant frequency of the secondary coil L2 becomes higher than the driving frequency of the primary coil L1 as in the case with the charger 1 (FIG. 3).

The charger 30 is constructed differently from the charger 1 with the added devices, comprising a variable frequency generating unit 31 capable of varying the frequency of oscillation signal to be generated in place of the driving frequency generating unit 5 (FIG. 1), a voltage detection unit 32, a oscillation frequency control unit 33, and an input voltage control unit 34. The charger 30 controls the variable frequency generating unit 31 by the oscillation frequency control unit 33 depending on the detection result of the voltage by the voltage detection unit 32 and simultaneously controls an input voltage to be supplied from the power source 2 by the input voltage control unit 34. Thus, the frequency and input voltage of the oscillation signal varies.

The variable frequency generating unit 31 supplies the generated oscillation signal to the driving circuit 4. The driving circuit drive-controls the current to be conducted to the primary coil L1 in accordance with the voltage level of the oscillation signal to flow the current in the forward direction and the backward direction alternately. Accordingly, the magnetic flux generated in the primary coil L1 varies with time. The secondary coil L2 generates an induced electromotive force in accordance with the linkage of the magnetic flux to be generated in the primary coil L1 and obtains an induced current which reverse according to the time-change of the magnetic flux with the induced electromotive force as the power source.

At this point, if the secondary battery is connected to the connection terminal of the electronic equipment having the secondary coil L2 as a load, an output voltage V of the secondary coil L2 side drops due to the load. Such output voltage drop affects the primary coil L1 side causing drop in the voltage to be generated in the primary coil L1. The charger 30 detects such voltage drops caused by the load, by the voltage detection unit 32 connected to the primary coil L1 in parallel. Moreover, since the case where the power source voltage rises by the power source 2 can be considered, the charger 30 also detects the voltage rise by the voltage detection unit 32.

The reference voltage is set in advance in the voltage detection unit 32 and at the time when the drop or rise of the voltage is detected, a detection signal S1 is sent to the oscillation frequency control unit 33 and the input voltage control unit 34.

The oscillation frequency control unit 33 supplies a control signal S2 to the variable frequency generating unit 31 in accordance with the detection signal S1, and when the voltage drop is detected, rises the frequency of oscillation signal formed by the variable frequency generating unit 31, and when the voltage rise is detected, drops the frequency of the oscillation signal formed by the variable frequency generating unit 31. Furthermore, the input voltage control unit 34 controls the input voltage supplied from the power source 2, in accordance with the detection signal S1, and when the voltage drop is detected, the input voltage control unit 34, after rising the input voltage, sends it out to the primary coil L1, and when the voltage rise is detected, after dropping the input voltage, sends it out to the primary coil L1.

The value of the induction voltage to be generated in the secondary coil L2 side is set to become the maximum value at the time when the resonant frequency $f_{OUT}$, i.e., the induced current produces resonance. The charger 30 adjusts the driving frequency $f_{OSC}$ within the fixed frequency range under the resonance frequency $f_{OUT}$ of the secondary coil L2 side by the variable frequency generating unit 31. Thus, in the charger 30, the driving frequency varies within the variable range by the variable frequency generating unit 31, and by changing the resonance frequency in the primary coil L1 side, the induction voltage to be generated in the secondary coil L2 side is risen or dropped.

Figure 10:
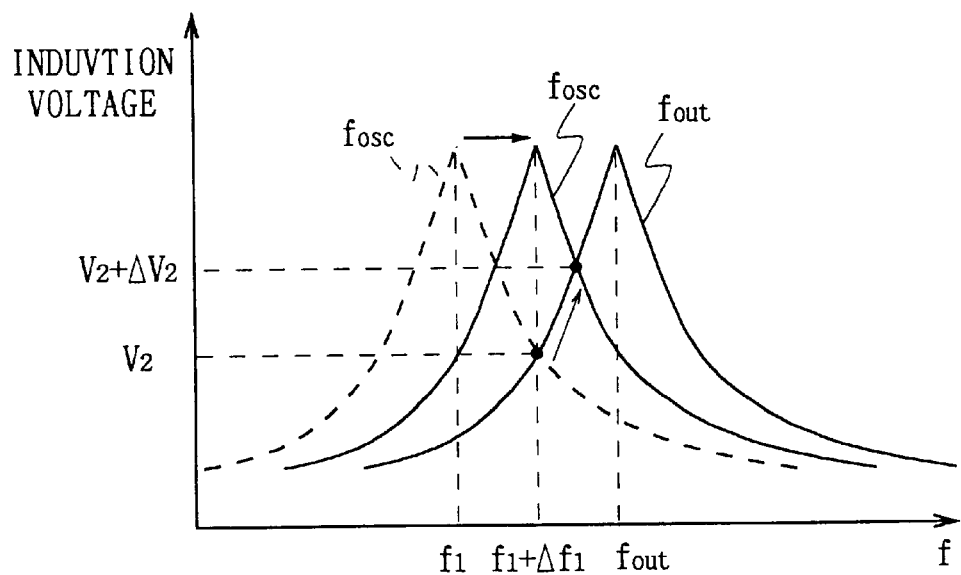
FIG. 10 is a diagram explaining the induction voltage control of the secondary coil side according to the frequency variation of the primary coil side.

As shown in FIG. 10, for example, by raising the frequency of oscillation signal, i.e., the driving frequency from $f_1$ by $\Delta f_1$, the induction voltage $V_2$ to be generated in the secondary coil L2 can be risen by $\Delta V_2$.

Figure 11:
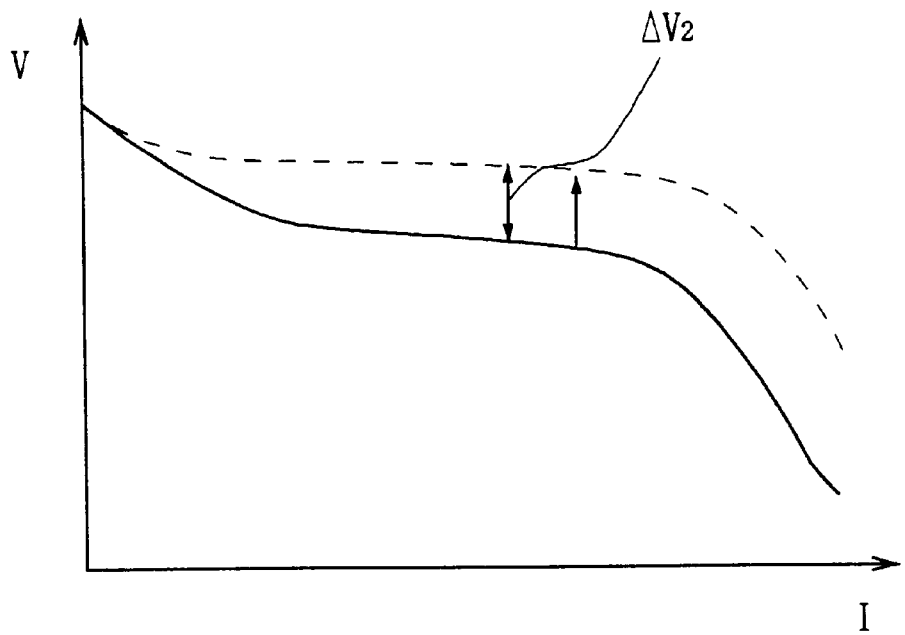
FIG. 11 is a diagram explaining the maintenance of the induction voltage according to the embodiment.

Accordingly, as shown in FIG. 11, when the induction voltage drops as shown by a solid line in FIG. 11 because the load is connected, the charger 30 detects the drop of the induction voltage indirectly by the voltage detection unit 32, and as a result of this detection, controlling the variable frequency generating unit 31 by the oscillation frequency control unit 33, raises the frequency of the oscillation signal, and simultaneously raises the power source voltage to be supplied from the power source 2 by the input voltage control unit 34 and supplying it to the primary coil L1. Thereby, the induction voltage can be increased by the voltage value dropped and the fixed voltage can be maintained as shown by a broken line in FIG. 11 In this connection, when the voltage rises, controlling the frequency and the voltage by the oscillation frequency control unit 33 and the input voltage control unit 34, the fixed voltage is maintained.

Figure 12:
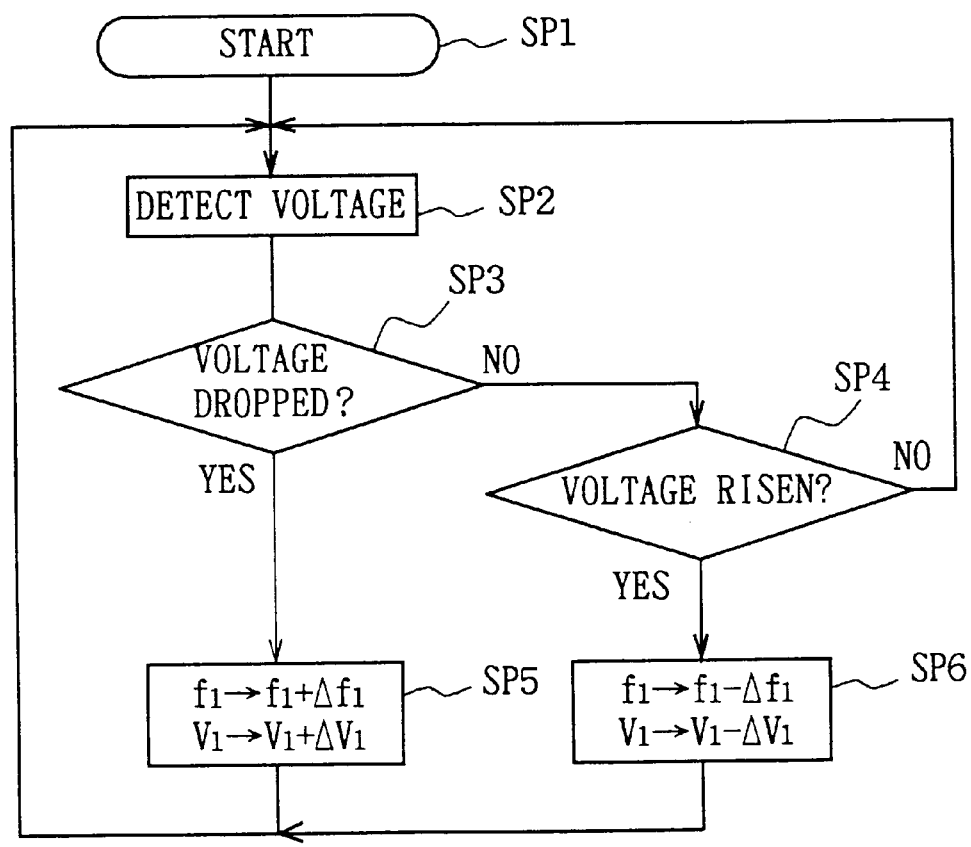
FIG. 12 is a flow chart explaining the procedure of the frequency control according to the voltage detection.

The charger 30 performs maintenance of the induction voltage to be generated in the secondary coil L2 side according to the procedure shown in FIG. 12. More specifically, firstly the charger 30 starts the procedure at step SP1. After starting the procedure, at step SP2, the charger 30 detects the voltage changes occurred in the primary coil L1 by the voltage detection unit 32. The charger 30 judges the detection result by using the detection signal S1. If the voltage drop is recognized at step SP3, it proceeds to step SP5. In addition, if the voltage drop is not recognized as the detection result by the detection signal S1, it proceeds to step SP4. The charger 30 judges the detection result by using the detection signal S1 and if the voltage rise is recognized at step SP4, the process than proceeds to step SP6. Moreover, if the voltage rise is not recognized as the detection result by the detection signal S1, the process then returns to step SP2.

When the voltage drop is recognized at step SP3, the charger 30 raises the frequency $f_1$ of the oscillation signal by $\Delta f_1$, at step SP5, according to the control of the variable frequency generating unit 31 by the oscillation frequency control unit 33, and raises the input voltage $V_1$ by $\Delta V_1$ according to the control of the input voltage by the input voltage control unit 34. Moreover, if the voltage rise is recognized at step SP4, the charger 30, at step SP6, lowers the frequency $f_1$ of the oscillation signal by $\Delta f_1$ according to the control of the variable frequency generating unit 31 by the oscillation frequency control unit 33, and also lowers the input voltage $V_1$ by $\Delta V_1$ according to the control of the input voltage by the input voltage control unit 34.

With the above arrangement, after conducting the frequency control and input voltage control, the charger 30 returns to step SP2 and repeats the procedure till the voltage drop or rise are not detected by the voltage detection, and by controlling the driving frequency and input voltage, compensates for the amount of voltage drop or rise of the induction voltage in the secondary coil L2 side.

According to the foregoing construction, the charger 30 detects the voltage changes occurred in the primary coil L1 by the voltage detection unit 32. When the voltage drop, i.e., the drop of induction voltage to be generated in the secondary coil L2 side, is detected by the detection, the charger 30 informs the detection result to the oscillation frequency control unit 33 and the input voltage control unit 34 by using the detection signal S1. The oscillation frequency control unit 33 controls the variable frequency generating unit 31 in accordance with the information and raises the frequency of the oscillation signal. Moreover, the input voltage control unit 34, after controlling and increasing the power source voltage to be supplied from the power source 2, transmits it to the primary coil L1.

Accordingly, the charger 30 can increase the induction voltage of the secondary coil L2 side indirectly by controlling the frequency and the input voltage of the oscillation signal. And if the induction voltage drops by connecting the load in the secondary coil L2 side, the charger 30 can increase the induction voltage by controlling the driving frequency and the input voltage, and maintain the induction voltage at the constant level to make it stable. When the voltage rises, the charger 30 can decrease the induction voltage in the same manner and thus, can maintain the induction voltage at the constant level to make it stable.

Furthermore, the charger 30 is arranged to increase or decrease the voltage by the control of the input voltage by the input voltage control unit 34 as well as the control of the driving frequency by the oscillation frequency control unit 33. Thus, the induction voltage can be corrected accurately by using the frequency control at the same time.

According to the foregoing construction, as well as increasing the resonant frequency of the secondary coil L2 side as compared with the driving frequency of the primary coil L1 side, and providing the variable frequency generating unit 31, the voltage detection unit 32, oscillation frequency control unit 33 and the input voltage control unit 34, if the voltage change is detected by the voltage detection, the driving frequency and the input voltage are controlled, thereby the driving frequency and the input voltage can be controlled and the induction voltage can be corrected indirectly at the time when the induction voltage varies in the secondary coil L2 side. Thus, the efficiency in the electric power transmission from the primary coil L1 to the secondary coil L2 can be improved and the induction voltage can be kept constant and stabilized.

(5) The Fifth Embodiment

Figure 13:
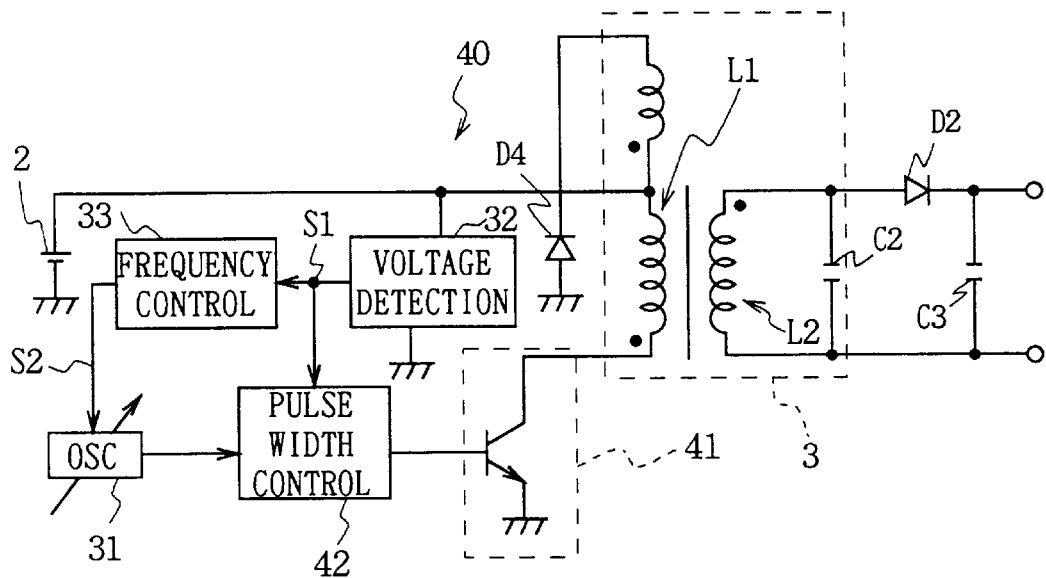
FIG. 13 is a block diagram showing the construction of a charger and an electronic equipment according to the fifth embodiment of the present invention.

In FIG. 13 in which the same reference numerals are applied to parts corresponding to FIG. 9, numeral 40 generally shows a charger and basically has a configuration similar to that of the charger 30 (FIG. 8). More specifically, the charger 40 flows the current to be supplied from the power source 2, to the primary coil L1 based on the frequency of the oscillation signal to be generated by the variable frequency generating unit 31, and generates the induced electromotive force in the secondary coil L2 side by the electromagnetic induction according to the changes of magnetic flux which is formed in the primary coil L1, and transmits the electric power. Moreover, the charger 40 detects the voltage changes by the voltage detection unit 32 and corrects the voltage changed depending on the detection result. Note that, the resonant frequency in the secondary coil L2 is set to become higher than the driving frequency of the primary coil L1 (FIG. 3) just as the charger 1 (FIG. 1).

The construction of the charger 40 differs from that of the charger 30 in that a driving circuit 41 for flowing the current periodically to the primary coil L1 in accordance with the frequency of the oscillation signal is provided in place of the driving circuit 4 which flows the current to the primary coil L1 in the forward and backward directions in accordance with the frequency of the oscillation signal, a damper diode D4 is connected to the primary coil L1 by another coil, and a pulse width control unit 42 is provided between the variable frequency generating unit 31 and the driving circuit 41 as well as eliminating the voltage control unit 34 (FIG. 9).

In the charger 40, the driving circuit 41 is comprised of only the transistor Tr1 and no capacitor is provided. In the charger 30, the magnetic flux varies with time by oscillating the current flowing through the primary coil L1 by the LC circuit comprised of the primary coil L1 and the capacitor C1 provided in the driving circuit 4 and turning the transistor Tr1 ON and OFF.

The driving circuit 41 inputs an oscillation signal to be supplied from the variable frequency generating unit 31 via the pulse width control unit 42 to the base electrode of the transistor Tr1. When the voltage level of the oscillation signal entered to the base electrode is positive, the transistor Tr1 conducts the current between the emitter electrode and the collector electrode. Thus, the current to be transmitted from the power source 2 flows through the primary coil L1.

Furthermore, in the case where the voltage level of the oscillation signal to be entered to the base electrode of the transistor Tr1 becomes the negative value, the transistor Tr1 intercepts the conduction between the emitter electrode and the collector electrode. Thus, the driving circuit 41 gives the pulse voltage based on the driving frequency of the oscillation signal to the primary coil L1 and periodically delivers the current to be sent out from the power source 2 to the primary coil L1. The magnetic flux to be generated in the primary coil L1 varies over time when the current is flowing and not flowing, and the induced electromotive force generated in the secondary coil L2 reverses due to the linkage of the magnetic flux. Accordingly, the induced current using the induced electromotive force as the power source is resonated by the LC circuit comprised of the secondary coil L2 and the capacitor C2 connected in parallel to the secondary coil L2.

The charger 40 supplies the pulse voltage to the primary coil L1 on the basis of the driving frequency of the oscillation signal and thus flowing the periodic current, generates an induced current in the secondary coil L2 side.

Furthermore, the charger 40 detects the voltage change of the primary coil L1 by the voltage detection unit 32. When the load is connected to the connection terminal of the secondary coil L2, the induction voltage varies due to the load and the voltage drops. Such induction voltage drop affects the primary coil L1 and causes the driving voltage drop. The charger 40, by detecting the voltage change of the primary coil L1 by the voltage detection unit 32, indirectly detects the voltage change in the induction voltage of the secondary coil L2.

The predetermined reference voltage value is set in advance in the voltage detection unit 32, and when the voltage change is detected by comparing with the reference voltage value, the detection result is notified by transmitting the detection signal S1 to the frequency control unit 33 and the pulse width control unit 42.

At the time when the voltage change is notified by the detection signal S1, the frequency control unit 33 transmits a control signal S2 to the variable frequency generating unit 31. Then, the variable frequency generating unit 31 changes the frequency of oscillation signal by the predetermined frequency in accordance with the control signal S2 and transmits this. More specifically, when the voltage drop is detected, the frequency control unit 33 outputs the control signal S2 and increases the frequency of oscillation signal which is transmitted by the variable frequency generating unit 31, i.e., the driving frequency by $\Delta f_1$. On the other hand, when the voltage rises, the frequency of the oscillation signal drops by $\Delta f_1$. Accordingly, the induction voltage in the secondary coil L2 side drops by $\Delta V_2$ (FIG. 9).

Furthermore, the pulse width control unit 42, when the voltage change is informed by the detection signal S1, changes the pulse width of the oscillation signal to be transmitted from the variable frequency generating unit 31, according to the pulse width modulation processing to supply this to the driving circuit 41. Specifically, the pulse width control unit 42 narrows the pulse interval by the fixed interval by modulating the pulse width during the period in which the voltage level of the oscillation signal is negative value. Accordingly, the charger 40, by narrowing the pulse width of the period in which the voltage level of the oscillation signal is negative value, shortens the cut-off period of the current by the driving circuit 41.

The pulse width control unit 42, by narrowing the pulse width of the period in which the voltage level of the oscillation signal is negative value, can shorten the period in which the transistor Tr1 is in the off condition. Since the period in which the transistor Tr1 is in the off condition becomes shorter and the induction period becomes longer, the input impedance is equivalently decreased and thus, the pulse voltage to be given to the primary coil L1 can be increased.

When the charger 40 indirectly detects the voltage change according to the load of the secondary coil L2 side, it controls the input voltage of the primary coil L1 by performing the variable control of the driving frequency by the frequency control unit 33 and the pulse width modulation control during the period in which the voltage level of the oscillation signal is negative by the pulse width control unit 42, and variable-controls and corrects the induction voltage generated in the secondary coil L2.

According to the foregoing construction, the charger 40 sets the resonant frequency to be generated in the secondary coil L2 to become higher than the driving frequency just as in the case of the charger 1, and simultaneously indirectly detects the voltage changes caused by the load of the secondary coil L2 side, by detecting the voltage change of the primary coil L1.

When the charger 40 detects the voltage drop, it increases the frequency of the oscillation signal (driving frequency) to be generated by the variable frequency generating unit 31 and simultaneously, narrows the pulse width during the period in which the voltage level of oscillation signal is negative. Moreover, when the charger 40 detects the voltage rise, it widens the pulse width during the period in which the voltage level of oscillation signal is negative as well as lowering the frequency of oscillation signal to be generated by the variable frequency generating unit 31, that is, the driving frequency.

At the time when the voltage drop is detected, the induction voltage to be generated in the secondary coil L2 is changed to high voltage by increasing the driving frequency according to the frequency control. Since the variable range of driving frequency is set at the preceding part of the resonant frequency in which the induction voltage becomes maximum, the induction voltage can be increased by increasing the driving frequency.

Similarly, when the voltage drop is detected, by narrowing the pulse width during the period in which the voltage level of the oscillation signal is negative, the current conducting period by the transistor Tr1 in the driving circuit 41 is made longer. Thus, by equivalently decreasing the internal resistance of the transistor Tr1, the input voltage to the primary coil L1 can be increased. Thus, the induction voltage to be generated in the secondary coil L2 side can be increased indirectly.

In the case where the voltage drop occurs in the driving voltage, the charger 40 raises the input voltage of the primary coil L1 by performing the frequency control and the pulse width modulation control, and thus indirectly raising and correcting the induction voltage decreased in the secondary coil L2 side due to the load connection, the voltage can be maintained at a constant level.

According to the foregoing construction, when the voltage change occurs in the secondary coil L2 side, by detecting the voltage changes of the input voltage to be generated in the primary coil L1 by the voltage detection unit 32, the voltage change of the secondary coil L2 can be detected indirectly, and also by raising or lowering the input voltage and driving frequency of the primary coil L1 by controlling the frequency and pulse width of the oscillation signal by the frequency control unit 33 and the pulse width control unit 42, the induction voltage to be generated in the secondary coil L2 side can be increased or decreased indirectly. Accordingly, by detecting the voltage changes due to the load connection of the secondary coil L2 side to correct the changed voltage, the voltage can be maintained at a constant level.

(6) The Sixth Embodiment

Figure 14:
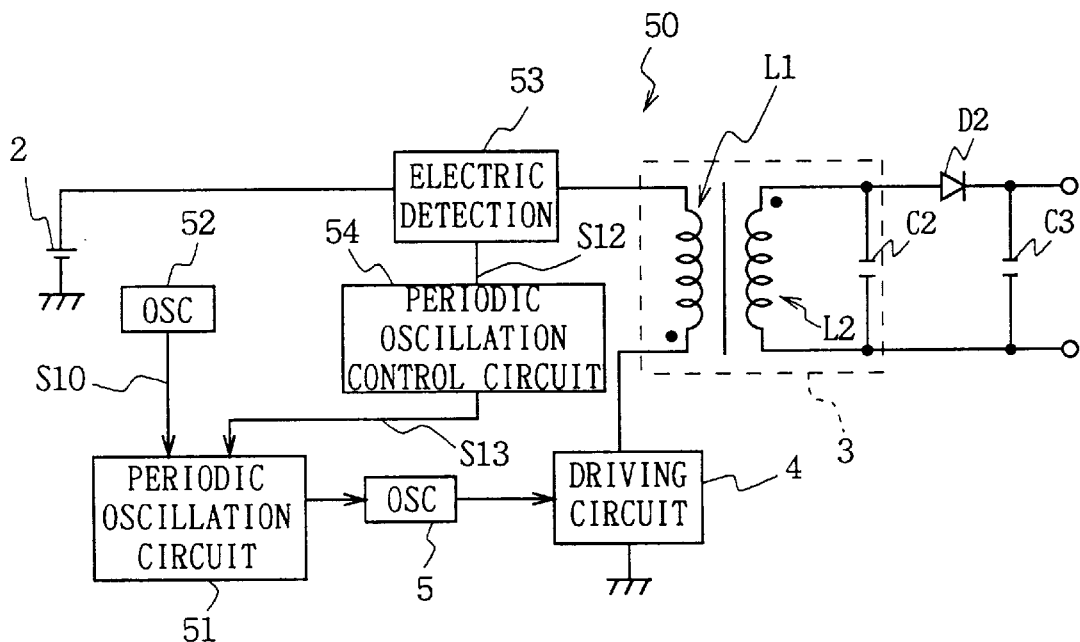
FIG. 14 is a block diagram showing the construction of a charger according to the sixth embodiment of the present invention.

In FIG. 14 in which the same reference numerals are applied to parts corresponding to FIG. 1, numeral 50 shows a charger having the almost same construction as the charger 1. More specifically, the charger 50 is comprised of a power source 2, an electromagnetic induction section 3, a driving circuit 4 and a driving frequency generating unit 5. The electromagnetic induction section 3 is formed by the primary coil L1 and the secondary coil L2 which are winded around the cores having the fixed shapes, and when performing a charging, the core winded by the secondary coil L2 arranged in the electronic equipment is placed on the position facing the core winded by the primary coil L1. The charger 50 drive-controls the conduction and interruption to the primary coil L1 by turning ON and OFF the transistor Tr1 of the driving circuit 4 by using the oscillation signal to be formed in the driving frequency generating unit 5, and thus, it flows the current to the primary coil L1 alternately in the forward and backward directions. Because of the current flowing in the forward direction and the reversed direction, the time-varying magnetic flux is generated; and an induced electromotive force is generated in the secondary coil L2 due to linkage of the magnetic flux and the current flows and is resonated by the LC circuit of the secondary coil L2 and the capacitor C2 connected in parallel. Moreover, the charger 50 is arranged so that the resonant frequency of the secondary coil L2 becomes high in comparison with the driving frequency of the primary coil L1 just as in the case of the charger 1 (FIG. 3).

In addition to the construction of the charger 1, the charger 50 is equipped with a periodic oscillation circuit 51, an oscillation circuit 52, a current detection unit 53 and a periodic oscillation control circuit 54.

The periodic oscillation circuit 51 periodically transmits the driving signal S11 to the driving frequency generating unit 5 at fixed intervals based on the oscillation signal S10 having the fixed frequency to be given from the oscillation circuit 52. The driving frequency generating unit 5 sends out the oscillation signal to the driving circuit 4 only at the time of receiving the driving signal S11. Thus, the charger 50 outputs the oscillation signal from the driving frequency generating unit 5 periodically and feeds the current for the fixed period of time to the primary coil L1. For example, in the case where the time at which the voltage level of oscillation signal S10 is positive is taken to be $t_1$ and the time at which the voltage level is negative is taken to be $t_2$, the periodic oscillation circuit 51 transmits the driving signal S51 at every time $t_2$ and keeps the transistor Tr1 in the ON condition by time $t_1$. Note that, the condition to transmit the oscillation signal periodically every fixed period from the driving frequency generating unit 5 is called the periodic operation mode. Further, the condition to transmit the oscillation signal continuously from the driving frequency generating unit 5 is called the complete operation mode.

Furthermore, the charger 50 detects the amount of current flowing from the power source 2 to the primary coil L1 by the current detection unit 53. The current detection unit 53 detects the amount of current flowing from the power source 2 to the primary coil L1 and transmits a detection signal S12 to the periodic oscillation control unit 54 to inform the detection result.

In the periodic oscillation control unit 54, the reference current volume I1 corresponding to the periodic operation mode and the reference current volume I2 corresponding to the complete operation mode are set as threshold values. The periodic oscillation control unit 54 compares the detection result given by the detection signal S12 with the threshold value and transmits a control signal S13 based on the comparison result to the periodic oscillation circuit 51. Specifically, as a result of detection, if the volume of current flowing into the primary coil L1 is the threshold value I1 or more, the periodic oscillation control unit 54 transmits the control signal S13 which makes the periodic oscillation circuit 51 the periodic operation mode. Moreover, if the detection result shows that the current volume flowing through the primary coil L1 is the threshold value I2 or less, the periodic oscillation control unit 54 transmits the control signal S13 which makes the periodic oscillation control unit 54 the complete operation mode.

The periodic oscillation circuit 51 is actuated by the control signal S13 with a periodic operation mode or complete operation mode, and in the case of periodic operation mode, it supplies the driving signal S11 to the driving frequency generating unit 5 at fixed intervals based on the oscillation signal S10, and in the case of complete operation mode, it supplies the driving signal S11 continuously to the driving frequency generating unit 5. For example, in the case of periodic operation mode, it supplies the oscillation signal to the driving frequency generating unit 5 and sends out the oscillation signal only when the voltage level of oscillation signal S10 is positive, and in the case of complete operation mode, it switches the driving signal S11 to be supplied to the driving frequency generating unit 5 into the one cramped to the positive voltage from the oscillation signal S10.

The charger 50 switches between the periodic operation mode and the complete operation mode in accordance with the volume of current flowing through the primary coil L1. In the case where the secondary coil L2 is not placed on the charging position, i.e., the position facing the primary coil L1, the load does not exist, therefore, the amount of current flowing through the primary coil L1 is maintained at the constant level. Here, in the case where the secondary coil L2 is placed on the charging position, the primary coil L1 and the secondary coil L2 are magnetically connected, and the quantity of current flowing through the primary coil L1 varies due to the load connected to the secondary coil L2. The charger 50 detects whether the secondary coil L2 is placed on the charging position or not based on the changes of the quantity of current, and if it detects that the secondary coil L2 is placed on the charging position, it switches the periodic oscillation circuit 51 which has been driven so far with the periodic operation mode, into the complete operation mode and supplies the current continuously to the primary coil L1.

According to the foregoing construction, the charger 50 switches between the periodic operation mode and the complete operation mode in accordance with the quantity of current flowing through the primary coil L1. In the case where the secondary coil L2 is not placed on the charging position, the quantity of current detected by the current detection unit 53 is the threshold value I1 set in advance or more, and if such a detection result is obtained, the periodic oscillation circuit 51 is driven by the control signal S13 to be sent out from the periodic oscillation control circuit 54 with the periodic operation mode. In the periodic operation mode, the oscillation signal generated by the driving frequency generating unit 5 is transmitted at the cycle of oscillation signal S10 to be generated by the oscillation circuit 52, periodically only for the fixed period of time, and thus, the current flows through the primary coil L1 at the cycle of the oscillation signal S10 periodically only for the fixed period of time. Accordingly, in a state where the secondary coil L2 is not placed on the charging position, i.e., it is not in a charging state, the current flowing through the primary coil L1 can be flowed periodically for only the fixed period of time, and thereby the consumption of electric power can be decreased.

Furthermore, in the case where the secondary coil L2 is placed on the charging position when the periodic oscillation circuit 51 is driving with the periodic operation mode, the quantity of electric current flowing through the primary coil L1 decreases due to the load of the secondary coil L2 side. At this point, the quantity of current to be detected by the current detection circuit 53 becomes lower than the threshold value I2 set in advance, and if such detection result is obtained, the periodic oscillation circuit 51 is driven with the complete operation mode by the control signal S13 to be transmitted from the periodic oscillation control circuit 54. In the complete operation mode, the oscillation signal to be generated by the driving frequency generating unit 5 is continuously transmitted and thus, the current flows through the primary coil L1 continuously.

The charger 50 detects by the change of the quantity of current that the secondary coil L2 is arranged on the charging position, and according to this detection, it can switch between the periodic operation mode which flows the current to the primary coil L1 at established intervals only for the fixed period of time and the complete operation mode which flows the current to the primary coil L1 continuously, and thus the consumption of electric power under the condition in which the secondary coil L2 is not placed on the charging position can be decreased.

According to the foregoing construction, since the quantity of current flowing through the primary coil L1 is detected by the current detection unit 53 arranged between the power source 2 and the primary coil L1 and as a result of detection, the periodic oscillation control circuit 54 switches the driving condition of the periodic oscillation circuit 51 the between the periodic operation mode and the complete operation mode, the current which flows through the primary coil L1 can flow continuously in the complete operation mode while in the periodic operation mode the current can periodically flow at established intervals, depending upon whether the secondary coil L2 is arranged in the charging position or not. Thereby, the consumption of power in the case where the secondary coil L2 is not arranged in the charging position, i.e., is not in the charging condition, can be decreased.

(7) Other Embodiments

Note that, in the aforementioned first to sixth embodiments, the resonant frequency $f_{OUT}$ of the secondary coil L2 side is adjusted based on the number of windings of the primary coil L1 and the secondary coil L2 and the capacity of capacitor C2 forming the LC circuit. However, the present invention is not limited thereto and the secondary coil L2 is connected with a coil in series and then the resonant frequency $f_{OUT}$ of the secondary coil L2 side can be adjusted by an external inductance to be obtained by the coil. Accordingly, the present invention can cope with the case where the degree of coupling between the primary coil and the secondary coil is tight enough and the leakage inductance is low and the case where the capacity of capacitor is kept low, and in addition noise element can be reduced.

Furthermore, in the aforementioned first to fourth and the sixth embodiments, so-called resonant type driving circuit 4 which flows current to the primary coil L1 in the forward direction and the backward direction alternately is provided. However, the present invention is not limited thereto and the pulse type driving circuit 4 which flows the current periodically to the primary coil L1 can be provided.

Furthermore, the aforementioned first to sixth embodiments, the bipolar type transistor Tr1 is provided in the driving circuit 4. However, the present invention is not limited thereto and a magnetic field effective transistor can be provided instead of a bipolar transistor.

Furthermore, the aforementioned second embodiment, voltage values of the induction voltages of the secondary coils L2A and L2B are set at almost equal voltage values by adjusting the ratio of windings of the secondary coils L2A and L2B. However, the present invention is not only limited thereto and the impedance element is connected to the fore part of either one or both of these diode D2 provided at the back stage of the secondary coil 2A and diode D3 provided at the back stage of the secondary coil L2B, thereby the voltage values of the induction voltages can be made almost equal voltage values and the induced currents running from the secondary coil L2A and L2B can be rectified.

Moreover, in the fourth and fifth embodiments, the input voltage of the primary coil L1 is detected, and the driving frequency and the input voltage or the pulse width of oscillation signal are controlled at the time of detecting the voltage variation, and the voltage variation of the induction voltage of the secondary coil L2 side is corrected. However, the present invention is not limited thereto and a current detection unit can be provided in place of the voltage detection unit 32 and the driving frequency and input voltage or the pulse width of oscillation signal can be controlled according to the result of current detection.

Furthermore, in the fifth embodiment, the voltage variation of the induction voltage of the secondary coil L2 is corrected side by controlling the driving frequency and the pulse width of oscillation signal. However, the present invention is not limited thereto and either one of the frequency control or pulse width control can be used.

Moreover, in the fifth embodiment, the driving frequency and the pulse width of oscillation signal after detecting the voltage variation of input voltage of the primary coil L1. However, the present invention is not limited thereto and the third coil is provided in the electromagnetic induction section 3 in addition to the primary coil L1, the voltage variation to be occurred in the coil can be detected and the driving frequency and the pulse width of oscillation signal can be controlled in accordance with the detection result.

Furthermore, in the aforementioned sixth embodiment, the driving signal S11 is supplied from the periodic oscillation circuit 51 to the driving frequency generating unit 5 at the fixed intervals based on the oscillation signal S10 generated by the oscillation circuit 52, and during this period the oscillation signal is sent out to flow the current to the primary coil L1. However, the present invention is not limited thereto and switching means is provided between the driving frequency generating unit 5 and the driving circuit 4 and by transmitting a switching signal from the periodic oscillation circuit 51 every fixed cycle based on the oscillation signal S10 to be generated by the oscillation circuit 52, the ON-OFF condition of the switching means can be switched. More specifically, in the case of periodic operation mode, the switching means is kept ON condition only during the period of time when the voltage level of oscillation signal S10 is a positive value, and supplies the oscillation signal to the driving circuit 4. Moreover, in the case of complete operation mode, the switching means is left in the ON condition. Thus, as in the case of this embodiment, the conducting condition of current flowing through the primary coil L1 can be shifted by the periodic operation mode and the complete operation mode.

Figure 15:
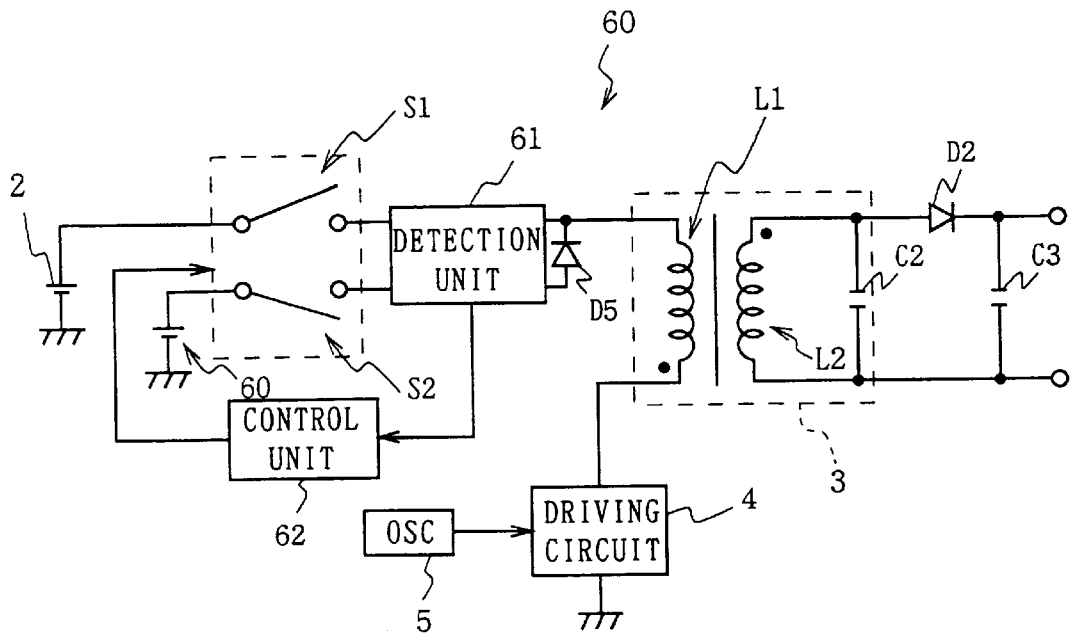
FIG. 15 is a block diagram showing the construction of a charger according to the other embodiment.

Furthermore, in the sixth embodiment, the quantity of current flowing through the primary coil L1 is detected and the periodic operation mode and the complete operation mode are switched. However, the present invention is not limited thereto and as shown in FIG. 15, a battery power source 60 can be provided in addition to the AC power source 2 to connect to the primary coil L1 and moreover, switching units S1 and S2 can be provided between the power source 2 and the battery power source and the primary coil L1 respectively. And moreover, a detection unit 61 for detecting the amount of current flowing through the primary coil L1 and a control unit 62 for controlling the switching units S1 and S2 can be provided.

In this case, the detection unit 61 detects based on a current detection whether or not the secondary coil L2 is placed on the charging position, the control unit 62 controls ON-OFF conditions of the switching units S1 and S2 in accordance with the detection result; if a small quantity of current is enough to flow through the primary coil L1 such as in the case where the primary coil L2 is not at the charging position, the switch S2 is set to the ON condition and the switch S1 is set to OFF condition in order to supply the consuming current from the battery power source 60, while in the case where the secondary coil L2 is placed on the charging position, the switch S1 is turned to the ON condition and the switch S2 is turned to the OFF condition to supply the power source current to be transmitted from the power source 2 to the primary coil L1. Thus, the current consumption at the time when the secondary coil L2 is not at the charging position can be reduced.

Moreover, in the sixth embodiment, the charger 50 switches based on the detection of the quantity of current between the periodic operation mode and the complete operation mode. However, the present invention is not limited thereto and the periodic operation mode and the complete operation mode can be switched by detecting the frequency or voltage.

The secondary coil L2 is connected with the capacitor C2 in parallel in order to produce resonance, and in the case where the secondary coil L2 is placed at the charging position, frequency of voltage which occurs in the primary coil L1, i.e., the driving frequency, varies. Similarly, in the voltage value, the waveform of the pulse voltage varies due to resonance between the primary coil L1 and the secondary coil L2, such as overshoot occurs. If the detection means for detecting the frequency variation, voltage variation or the waveform variation of the pulse voltage is provided in the charger 50 in place of the current detection unit 53, and the detection result is informed to the periodic oscillation control unit 54 (FIG. 14), the same effect as those of the embodiment can be obtained.

Figure 16:
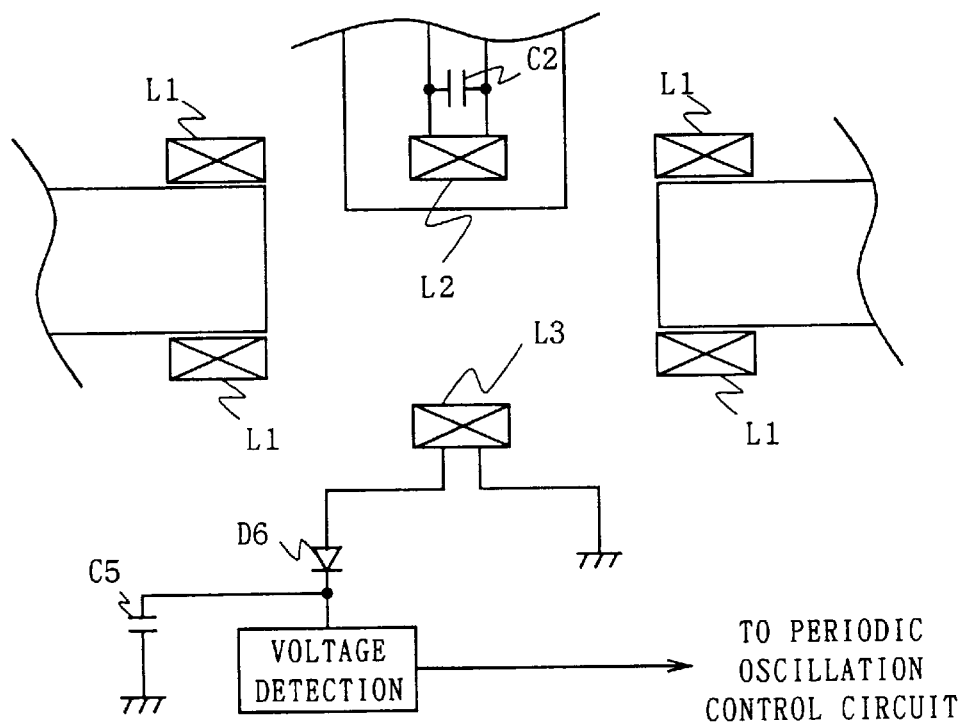
FIG. 16 is a block diagram showing the construction of a charger according to the other embodiment.

Furthermore, in the sixth embodiment, the quantity of current flowing through the primary coil L1 is detected by the current detection unit 53. However, the present invention is not limited thereto and as shown in FIG. 16, by arranging a tertiary coil L3 on the position facing the charging position of the secondary coil L2 and detecting the voltage variation of the tertiary coil L3, the detection result can be informed to the periodic oscillation control unit 54 (FIG. 14). When the secondary coil L2 is placed on the charging position, the resonant voltage to be generated in the tertiary coil L3 drops by the linkage of the magnetic flux produced in the primary coil, and thus, the fact that the secondary coil L2 is placed on the charging position can be detected.

Moreover, in the sixth embodiment, the quantity of current flowing through the primary coil L1 is detected by the current detection unit 53. However, the present invention is not limited thereto and a supplementary coil is provided in addition to the primary coil L1 and to which electric current is supplied from the battery power source having small power, a piece of metal or a coil shaped metal may be placed at the position facing the supplementary coil in the electronic equipment side. In the case where the piece of metal or the coil-shaped metal is placed on the position facing the supplementary coil, that is, the electronic equipment is placed on the charging position, variation in the current flowing through the supplementary coil occurs and by detecting the variation, it can be judged that the electronic equipment is placed at the charging position. In addition, if the judgment result is informed to the periodic oscillation control unit 54 (FIG. 14), the same effect as those of the embodiment can be obtained.

Furthermore, the first to the sixth embodiments is applied to the chargers 1, 10, 20, 30, 40 and 50 which conduct charging to the secondary battery built in the electronic equipment. However, the present invention is not limited thereto and it may be applied to the case of using the electric power to be transmitted from the primary coil side as a driving power directly in the electronic equipment side having the secondary coil. Specifically, the aforementioned embodiments are applicable to the electric power transmission device which transmits the power by the electromagnetic induction from the primary coil side to the secondary coil side.

Industrial Applicability

The present invention can be utilized for a charger which conducts charging to the secondary battery built in a portable compact electronic equipment.

We claim:

1. An electric power transmission device for transmitting electric power between a primary coil and a secondary coil, comprising:

signal generating means for generating and transmitting an oscillation signal having a fixed frequency;

current supplying means for supplying current to said primary coil;

driving means for drive-controlling a conduction and interruption of said current from said current supplying means to said primary coil at the frequency of said oscillation signal;

said primary coil generating a time-varying magnetic flux at said frequency of said oscillation signal caused by the conduction and interruption of said current by said driving control means;

said secondary coil having a capacitance element connected thereto in parallel for generating an induced electromotive force in accordance with a linkage of said time-varying magnetic flux produced by said primary coil, and for oscillating an induced current generated using said induced electromotive force between said capacitance element and said secondary coil with a frequency higher than said frequency of said oscillation signal as a resonant frequency, wherein said electric power is transmitted from said primary coil to said secondary coil by generating said induced electromotive force in said secondary coil by the linkage of said time-varying magnetic generated in said primary coil.

2. The electric power transmission device according to claim 1, wherein said secondary coil rectifies and outputs said induced current generated when the conduction of said current to said primary coil is interrupted.

3. The electric power transmission device according to claim 1, wherein said primary coil and said secondary coil wound around cores having fixed shapes, respectively, and centers of said respective cores are shifted relative to each other.

4. The electric power device according to claim 3, wherein said core having said primary coil wound thereon is formed so that a cross sectional area thereof is larger than a cross sectional area of said core having said secondary coil wound thereon.

5. The electric power transmission device according to claim 1, comprising:

detecting means for detecting predetermined parameter variations which occur in said primary coil;

controlling means for transmitting one of a first and a second control signal in accordance with a detection result of said detecting means; and periodic oscillation means for periodically supplying said oscillation signal to said driving means at every fixed timing only for a fixed period of time in when the first control signal is supplied, and for supplying said oscillation signal continuously to said driving means when said second control signal is supplied.

6. The electric power transmission device according to claim 1, comprising:

a tertiary coil provided separately from said primary coil and secondary coil;

detecting means for detecting predetermined parameter variations which occur in said tertiary coil;

control means for transmitting one of a first and second control signal in accordance with a detection result of said detecting means; and periodic oscillating means for supplying said oscillation signal to said driving means at every fixed timing for a fixed period of time when said first control signal is supplied, and for supplying said oscillation signal continuously to said driving means when said second control signal is supplied.

7. The electric power transmission device according to claim 6, wherein said tertiary coil is positioned in the vicinity of said secondary coil within a range of the linkage of said magnetic flux produced by said primary coil.

8. The electric power transmission device according to claim 6, wherein said tertiary coil is positioned facing a piece of metal placed at a fixed position in an electronic equipment having said secondary coil, and said power transmission device further comprising:

second signal generating means for generating and transmitting a second oscillation signal having a fixed frequency;

second current supplying means for supplying a current to said tertiary coil; and second driving means for drive-controlling a conduction and interruption of said current supplied from said second electric power supplying means to said tertiary coil, at a frequency of said second oscillation signal.

9. An electric power transmission method for transmitting electric power between a primary coil and a secondary coil which are out of contact with each other, comprising the steps of:

drive-controlling a current conduction and interruption of current to said primary coil in accordance with an oscillation signal having a predetermined frequency;

generating a time-varying magnetic flux at the frequency of said oscillation signal in said primary coil by said conduction and interruption of the current by said driving control means; and transmitting said electric power from said primary coil to said secondary coil by generating an induced electromotive force in said secondary coil by the linkage of said generated magnetic flux in said primary coil, wherein an induced current generated by said induced electromotive force is resonated with a frequency higher than the frequency of said oscillation signal.

10. The electric power transmission method according to claim 9, wherein said inducted current generated in said secondary coil is rectified and outputted when the conduction of said current to said primary coil is interrupted.

11. The electric power transmission method according to claim 9, wherein said primary coil and said secondary coil are wound around cores having respective prescribed forms are placed at the positions and further comprising shifting centers of said respective cores relative to each other.

12. The electric power transmission method according to claim 11, wherein a cross sectional area of said core having said primary coil wound thereon is arranged to be larger than a separate cross sectional area of said core having said secondary coil wound thereon.

13. The electric power transmission method according to claim 9, further comprising:

a detecting step of detecting predetermined parameter variations which occur in said primary coil;

a control step of transmitting one of a first and a second control signal in accordance with a detection result in said detecting step; and a periodic oscillation switching step of periodically drive-controlling the conduction and interruption to said primary coil at every fixed timing for a fixed period of time in when said first control signal is supplied, and of continuously drive-controlling the conduction and interruption to said primary coil in when said second control signal is supplied.

14. The electric power transmission method according to claim 9, further comprising:

a detecting step of detecting prescribed parameter variations which occur in a tertiary coil provided separately from said primary coil and said secondary coil;

a control step of transmitting one of a first and a second control signal in accordance with a detection result in said detecting step; and a periodic oscillation switching step of periodically drive-controlling the conduction and interruption to said primary coil at every predetermined timing for a fixed period of time in when said first control signal is supplied, and of continuously drive-controlling the induction and interruption to said primary coil in when said second control signal is supplied.

* * * * *